US010927504B2

(12) United States Patent
Backfolk et al.

(10) Patent No.: US 10,927,504 B2
(45) Date of Patent: Feb. 23, 2021

(54) MICROFIBRILLATED FILM

(71) Applicant: Stora Enso OYJ, Helsinki (FI)

(72) Inventors: Kaj Backfolk, Villmanstrand (FI); Isto Heiskanen, Imatra (FI); Esa Saukkonen, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 50 days.

(21) Appl. No.: 16/312,449

(22) PCT Filed: Jun. 20, 2017

(86) PCT No.: PCT/IB2017/053642
§ 371 (c)(1),
(2) Date: Dec. 21, 2018

(87) PCT Pub. No.: WO2017/221137
PCT Pub. Date: Dec. 28, 2017

(65) Prior Publication Data
US 2019/0234020 A1 Aug. 1, 2019

(30) Foreign Application Priority Data

Jun. 22, 2016 (SE) .................... 1650900-2

(51) Int. Cl.
D21H 15/10 (2006.01)
D21H 27/10 (2006.01)
B32B 27/36 (2006.01)
D21H 27/38 (2006.01)
B32B 7/12 (2006.01)
(Continued)

(52) U.S. Cl.
CPC .............. *D21H 15/10* (2013.01); *B32B 7/12* (2013.01); *B32B 27/10* (2013.01); *B32B 27/32* (2013.01); *B32B 27/36* (2013.01); *D21F 1/10* (2013.01); *D21G 1/00* (2013.01); *D21H 11/18* (2013.01); *D21H 17/24* (2013.01); *D21H 17/68* (2013.01); *D21H 19/22* (2013.01); *D21H 19/824* (2013.01); *D21H 21/06* (2013.01); *D21H 27/10* (2013.01); *D21H 27/38* (2013.01); *B32B 29/00* (2013.01); *B32B 2250/02* (2013.01); *B32B 2262/062* (2013.01); *B32B 2262/065* (2013.01); *B32B 2262/067* (2013.01); *B32B 2307/542* (2013.01); *B32B 2307/5825* (2013.01); *B32B 2307/718* (2013.01); *B32B 2307/7244* (2013.01); *B32B 2307/732* (2013.01); *B32B 2439/40* (2013.01); *B32B 2439/70* (2013.01); *B65D 65/38* (2013.01); *B65D 81/34* (2013.01)

(58) Field of Classification Search
CPC ........ D21H 11/18; D21H 27/10; D21H 19/34; D21H 17/24; D21H 17/68; D21H 17/28; D21H 19/22; D21H 27/30; D21H 27/38; D21H 15/10; D21H 19/824; D21H 21/06; D21H 21/20; D21H 11/02; D21H 11/08; D21H 17/31; D21H 19/00; B32B 2307/7244; B32B 27/10; B32B 27/32; B32B 2250/02; B32B 2262/062; B32B 29/00; B32B 2307/718; B32B 2439/40; B32B 2439/70; B32B 27/306; B32B 27/36; B32B 29/02; B32B 15/085; B32B 2255/10; B32B 2255/205; B32B 2255/26; B32B 2255/28; B32B 2262/065; B32B 2262/067; B32B 2307/542; B32B 2307/5825; B32B 2307/7246; B32B 2439/00; B32B 2553/00; B32B 27/08; B32B 27/12; B32B 3/26; B32B 5/06; B32B 7/12; B82Y 30/00; B65D 65/38; B65D 81/34; D21F 11/00; D21F 1/10; D21G 1/00

See application file for complete search history.

(56) References Cited

U.S. PATENT DOCUMENTS 10,501,890 B2 * 12/2019 Heiskanen ............. D21H 11/18
10,577,747 B2 * 3/2020 Heiskanen ........... D21H 17/375
(Continued)

FOREIGN PATENT DOCUMENTS

EP 2554589 6/2013
SE 1451581 A1 * 6/2016 ............. D21H 19/34
(Continued)

OTHER PUBLICATIONS

Adman, Anna, "Dewatering of Nanocellulose in a DDA" Bachelor thesis within Chemical engineering, pp. 1-22. (Year: 2015).*
(Continued)

Primary Examiner — Jose A Fortuna
(74) Attorney, Agent, or Firm — Greer, Burns & Crain, Ltd.

(57) ABSTRACT

A method of producing a microfibrillated cellulose (MFC) film comprising reinforcement fibers. The method includes: providing a suspension comprising a first MFC in an amount of at least 50 weight %, reinforcement fibers in an amount of at least 5 weight %, all percentages calculated on the total solid content of said suspension, and a formation aid; mixing said suspension to form a mixture; forming a fibrous web from the mixture; and dewatering and/or drying said fibrous web to form a film having a basis weight of less than 40 g/m$^2$, a specific formation number of below 0.45 g$^{0.5}$/m$^2$, and an Oxygen Transmission Rate (OTR) value of below 100 ml/m$^2$/per 24 hours, preferably of below 50 ml/m$^2$per 24 hours at 50% relative humidity. Also, a film and use of the film in food or liquid packaging applications.

23 Claims, No Drawings

(51) Int. Cl.

| | | |
|---|---|---|
| *D21H 11/18* | (2006.01) | |
| *B32B 27/10* | (2006.01) | |
| *B32B 27/32* | (2006.01) | |
| *D21F 1/10* | (2006.01) | |
| *D21G 1/00* | (2006.01) | |
| *D21H 17/24* | (2006.01) | |
| *D21H 17/68* | (2006.01) | |
| *D21H 19/22* | (2006.01) | |
| *D21H 19/82* | (2006.01) | |
| *D21H 21/06* | (2006.01) | |
| *B23B 29/00* | (2006.01) | |
| *B65D 81/34* | (2006.01) | |
| *B65D 65/38* | (2006.01) | |
| *B32B 29/00* | (2006.01) | |

(56) References Cited

U.S. PATENT DOCUMENTS

| | | | | |
|---|---|---|---|---|
| 2012/0298319 | A1 | 11/2012 | Fujiwara | |
| 2013/0053454 | A1* | 2/2013 | Heiskanen | C09D 101/02 514/781 |
| 2013/0209772 | A1* | 8/2013 | Sandstrom | D21H 11/18 428/220 |
| 2014/0065406 | A1* | 3/2014 | Berglund | D21H 27/10 428/221 |
| 2018/0245286 | A1* | 8/2018 | Heiskanen | D21H 27/30 |
| 2019/0024318 | A1* | 1/2019 | Backfolk | D21H 17/29 |
| 2019/0048527 | A1* | 2/2019 | Heiskanen | D21H 21/20 |
| 2019/0226146 | A1* | 7/2019 | Pihko | C08B 15/02 |
| 2019/0234020 | A1* | 8/2019 | Backfolk | D21H 11/18 |
| 2019/0248988 | A1* | 8/2019 | Heiskanen | C09D 101/02 |
| 2019/0276619 | A1* | 9/2019 | Saukkonen | D21H 25/04 |
| 2019/0276621 | A1* | 9/2019 | Heiskanen | D21H 13/00 |
| 2019/0292337 | A1* | 9/2019 | Heiskanen | D21H 11/12 |
| 2019/0292727 | A1* | 9/2019 | Backfolk | D21H 11/18 |
| 2020/0010629 | A1* | 1/2020 | Backfolk | C08K 3/346 |
| 2020/0023409 | A1* | 1/2020 | Axrup | B32B 29/00 |
| 2020/0023627 | A1* | 1/2020 | Heiskanen | D21H 19/10 |
| 2020/0086604 | A1* | 3/2020 | Land Hensdal | C08L 1/02 |
| 2020/0173109 | A1* | 6/2020 | Saukkonen | B32B 23/06 |

FOREIGN PATENT DOCUMENTS

| | | | | |
|---|---|---|---|---|
| WO | | 2008076056 | 6/2008 | |
| WO | | 2014147295 | 9/2014 | |
| WO | | 2015136493 | 9/2015 | |
| WO | WO-2017221137 | A1 * | 12/2017 | D21F 1/10 |
| WO | WO-2018211441 | A1 * | 11/2018 | D21H 25/04 |

OTHER PUBLICATIONS

Lee, Peter F.W. In "Effect of high molecular mass anionic polymers on paper sheet formation," Nordic Pulp and Paper Research Journal, No. 2, pp. 61-70 (Year: 1989).*

International Searching Authority, Written Opinion of the International Searching Authority, PCT/IB2017/053642, dated Dec. 28, 2017.

International Searching Authority, International Search Report, PCT/IB2017/053642, dated Dec. 28, 2017.

Chinga-Carrasco, G., "Cellulose Fibres, Nanofibrils and Microfibrils: The Morphological Sequence of MFC Components from a Plant Physiology and Fibre Technology Point of View," Nanoscale Research Letters 2011.

Fengel, D., "Ultrastructural Behavior of Cell Wall Polysaccharides," Tappi J., Mar. 1970, vol. 53, No. 3.

* cited by examiner

MICROFIBRILLATED FILM

This application is a U.S. National Phase under 35 U.S.C. § 371 of International Application No. PCT/IB2017/053642, filed Jun. 20, 2017, which claims priority under 35 U.S.C. §§ 119 and 365 to Swedish Application No. 1650900-2, filed Jun. 22, 2016.

The present invention relates to a method of manufacturing a fibrous-based oxygen barrier film. The invention further covers films made by the method and uses thereof.

BACKGROUND OF THE INVENTION

An effective gas and/or aroma barrier and particularly oxygen barrier is required in packaging industry for shielding products that are oxygen-sensitive, thereby extending their shelf-life. These include many food products in particular but also pharmaceutical products and in electronic industry. Known packaging materials with oxygen barrier properties may be comprised of one or several polymer films or of a fibrous paper or board coated with one or several layers of an oxygen barrier polymer, usually as part of a multilayer coating structure.

More recently, microfibrillated cellulose (MFC) films, in which defibrillated cellulosic fibrils have been suspended e.g. in water, re-organized and rebonded together thus forming a film that is predominantly continuous and provides good gas barrier properties.

The publication EP 2 554 589 A1 describes preparation of such films, in which an aqueous cellulose nanofiber dispersion is coated on a paper or polymeric substrate, dried and finally peeled off as a nanofiber film sheet. However, this method is not easily scalable, it might be sensitive to substrate—MFC adhesion and there is a risk that the properties of the film surfaces differ.

US2012298319A teaches a method of manufacturing of MFC film by applying furnish comprising MFC directly on porous substrate thus allowing the MFC to be dewatered and filtered. However, when forming films from finer MFC, problems connected to the dewatering and the runnability may arise Films made from MFC have shown to have quite good oxygen barrier properties. However, when forming MFC films of low grammage and thickness, the film may easily break during wet web forming, converting or handling. Moreover MFC is a comparatively expensive fiber source. There thus remains a wish to further improve the properties of MFC films.

SUMMARY OF THE INVENTION

It is an object of the present disclosure to enable the manufacturing of a thin MFC film, which shows high oxygen barrier properties, is easy to handle, easy to produce at higher speeds, easy to convert, and makes use of more cost-efficient raw materials.

This object, and further advantages, is wholly or partially achieved by the method, the film and the use thereof according to the appended independent claims. Embodiments are set forth in the appended dependent claims, and in the following description.

According to a first aspect of the invention, there is provided a method of manufacturing a film comprising the steps of:
providing a suspension comprising a first microfibrillated cellulose (MFC) in an amount of at least 50 weight %, reinforcement fibers in an amount of at least 5 weight %, all percentages calculated on the total solid content of said suspension, and a formation aid,
mixing said suspension to form a mixture,
forming a fibrous web from the mixture, and
dewatering said fibrous web to form a film having a basis weight of less than 40 g/m2, a specific formation number of below 0.45 $g^{0.5}/m^2$, and an Oxygen Transmission Rate (OTR) value of below 100 $ml/m^2$/per 24 hours, preferably of below 50 $ml/m^2$ per 24 hours determined at 50% relative humidity in accordance with ASTM D 3985-05.

The reinforcement fibers, which preferably have a length-weighted average length of >0.8 mm, may be added to the suspension in an amount of e.g. 5-25 weight %, 10-25%, or most preferably of 10-15 weight %, as calculated on the total solid content of said suspension.

The inventors have surprisingly found that it is possible to provide an MFC film comprising reinforcement fibers, which film shows excellent OTR values and is easy to handle. The mixing of the suspension comprising MFC, reinforcement fibers and a formation aid improves the formation of the film, generating a formation number of below 0.45 $g^{0.5}/m$, which in turn provides the film with great oxygen barrier properties. Moreover, the presence of the reinforcement fibers renders the film easier to handle, the drainability and the runnability are improved and the strength properties of the film are improved. The method of the invention enhances the distribution of the fibers and counteracts the formation of flocks of MFC or of reinforcement fibers, which flocks may have a negative impact on the properties of the film, especially on the oxygen barrier properties. The formation may be further enhanced by other means, e.g. by optimizing the pH, temperature and salt concentration of the suspension and/or by use of ultrasound assisted dewatering of the formed web or other means well known to the skilled person.

According to one embodiment, the first MFC may have a Schopper-Riegler value (SR) of at least 85, preferably of at least 90. Said first MFC is preferably made from softwood fibers, preferably from pine fibers. Such highly refined MFC from softwood fibers gives rise to superior oxygen properties.

The reinforcement fibers may exhibit an SR value of below 60, preferably of below 40. Preferably, said reinforcement fibers are hardwood kraft fibers. The use of hardwood fibers as reinforcement fibers improves the formation of the film. Without wishing to be bound to any theory, this may be due to that hardwood fibers comprises a higher amount of hemicellulose and therefore can be more easily dispersed in the MFC film matrix, and furthermore, collapse more easily at film forming.

In one embodiment, the formation aid is added to the reinforcement fibers before these are mixed with the first MFC.

In another embodiment, the formation aid may be added to the first MFC at the formation thereof. In this embodiment, the formation aid, e.g. APAM, may be added to a slurry comprising cellulose fibers, whereupon the slurry comprising fibers and the formation aid is subjected to a mechanical treatment to form a composition comprising microfibrillated cellulose and the formation aid. Thereafter, said composition may be mixed with the reinforcement fibers.

According to one embodiment, the reinforcement fibers have been mechanically treated before being added to the suspension. Mechanical treatment of the reinforcement fibers, e.g. by refining, enhances the collapsing behavior and improves the shear strength and tear resistance of the formed film. Alternatively, the reinforcement fibers have been chemically treated before being added to the suspension.

Preferably, the reinforcement fibers are never dried fibers. Such fibers collapse even more easily, which further improves the film forming. Never dried fibers are fibers that have not been dried, i.e. non-hornified fibers. Conventional technologies to produce cellulose pulp include various aqueous chemical treatments which give rise to cellulose fibers in wet state (e.g. containing 50-70 w % of water). The reinforcement fibers used in the present invention are preferably such fibers that has never been dried after preparation of cellulose pulp. Such never-dried fibers are usually non-hornified fibers and in a swollen and more accessible state compared to fibers that have been dried and rewetted.

The formation aid may be chosen from the group consisting of anionic polyelectrolytes, a second finer MFC having an SR value higher than that of the first MFC, modified starch, gum-like natural polymers or their synthetic equivalents, polyethylene oxides, metaphosphates and unmodified or modified PVA. The anionic polyelectrolyte may include anionic polyacrylamide (APAM) and/or water soluble salts of poly/acrylic acid, such as polyacrylates (e.g. sodium or ammonium polyacrylate). The gum-like polymer may be, e.g., guar gum, galactomannan, locust bean gum or deacetylated karaya gum. The modified starch may be e.g. carboxymethyl cellulose (CMC), preferably anionic CMC. The PVA is preferably anionic PVA.

According to one embodiment, APAM is chosen as formation aid. APAM may be added to the suspension in an amount giving rise to a content of said APAM in the web in the range of 0.1 to 5, preferably 0.1-1 (such as 0.5) kg/metric ton of the web.

In another embodiment, the formation aid is a second, finer MFC. The finer MFC may be present in the suspension in an amount giving rise to a content of said second MFC in the web in the range of 20-100, preferably in 30-80, e.g. 50, kg/metric ton of the web. The second, finer MFC may be added to the suspension in a separate step or it may be pre-mixed with the first MFC, i.e. the MFC added to the suspension may have a bimodal particle size distribution. The second, finer MFC may have an SR value and/or a viscosity that is higher than that of said first MFC. Preferably, the first MFC has a viscosity of below 4000 cP and said second MFC has a viscosity of above 4000 cP.

The fibers in said finer MFC may further, or alternatively, have a length-weighted average length smaller than said first MFC.

The method of the invention may further comprise the steps of forming the web by applying the suspension mixture onto a porous wire, dewatering the web, drying the web and, preferably, calendaring the web to form the film. Calendaring of the dewatered and dried film further improves the collapsing of the fibers.

In one embodiment, a polymer layer, preferably comprising a polyolefin or a biodegradable polymer, is applied onto the dewatered and/or dried film. The polyolefin may be polyethylene and/or polypropylene. The biodegradable polymer may e.g. be polylactic acid (PLA) or polybutulen succinate (PBS). The polymer may be extrusion coated onto the dewatered and dried film. It has been shown that a film comprising MFC and a smaller amount of longer reinforcement fiber, which film is polymer coated, with e.g. polyethylene, gives rise to extraordinary good barrier properties, showing OTR values of below 10 and even below 5 ml/m2/per 24 h at 23°, 50% RH. Remarkable good results have been shown especially when the longer fibers are derived from hardwood, e.g. birch, *eucalyptus* or aspen According to second aspect of the invention, there is provided a fibrous-based oxygen barrier film comprising:
 a first microfibrillated cellulose (MFC) in an amount of at least 50 weight %,
 reinforcement fibers having a length of >0.8 mm, in an amount of at least 5 weight %,
 a formation aid,
 said film exhibiting a basis weight of less than 40 g/m2, a specific formation number of below 0.45 $g^{0.5}/m^2$ and an oxygen transmission rate (OTR) of below 100 ml/m²/per 24 hours, preferably of below 50 ml/m²/per 24 hours, or even below 25 ml/m²/per 24 hours (ASTM D 3985-05), at 23°, 50% RH.

In a third aspect, the invention discloses a fibrous-based oxygen barrier film, which comprises:
 a first layer comprising
  microfibrillated cellulose (MFC) in an amount of at least 50 weight %,
  reinforcement fibers, preferably from hardwood fibers, having a length of >0.8 mm, in an amount of at least 5 weight %, and
  a formation aid,
 a second layer comprising a polyolefin, preferably polyethylene,
 said film exhibiting a basis weight of less than 40 g/m2 and an oxygen transmission rate (OTR) of below 10 ml/m²/per 24 hours at 23°, 50% RH, preferably of below 5 ml/m²/per 24 hours at 23°, 50% RH The film according to the second and the third aspect is further characterized by features appearing in the embodiments related to the first aspect.

In a forth aspect, the invention relates to the use of the film described above in food or liquid packaging applications. The flexible films of the invention are particularly useful in packaging material for oxygen-sensitive products, e.g. in packaging of food or liquid products.

DETAILED DESCRIPTION

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides, Tappi J.*, March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water.

The cellulose fiber is preferably fibrillated to such an extent that the final specific surface area of the formed MFC is from about 1 to about 300 m²/g, such as from 1 to 200 m²/g or more preferably 50-200 m²/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofbril (CMF) defining a cellolose nanofbire material containing multiple elementary fibrils with both crystalline and amorphous regions, having a high aspect ratio with width of 5-30 nm and aspect ratio usually greater than 50.

The oxygen transmission rate (OTR) as used in the patent claims and in the description is measured in accordance with (ASTM D 3985-05), in 24 hours at 23°, 50% RH.

The term "formation aid" as used herein, also sometimes referred to as "dispersant" or "dispersion agent", is a substance or polymer added to a suspension to separate particles/fibers from each other and to prevent flocculation.

The Schopper-Riegler value (SR), as used herein, can be obtained by use of the standard method defined in EN ISO 5267-1.

The specific formation number is measured by use of Ambertec Beta Formation instrument according to standard SCAN-P 92:09. Specific formation value is calculated as formation divided by the square root of the film grammage.

The viscosity, as used herein, is measured in accordance to the VTT Brookfield standard for CNF (cellulose nanofibers) by use of Brookfield rheometer, 100 rpm rotational speed, spindle vane-73, temperature 20° C., consistency 1.5%.

To practice the invention the MFC film is preferably formed in a paper or paperboard making machine or according to a wet laid production method, by providing a MFC suspension onto a wire and dewatering the web to form a film.

The MFC content of the suspension may be above 50 weight %, or above 70 weight % or above 80 weight %, based on the weight of solids of the suspension. Preferably the MFC content is in the range of from 50 to 95 weight-% based on the weight of solids of the suspension. In one embodiment, the microfibrillated cellulose content of the suspension may be in the range of 70 to 95 weight-%, in the range of 70 to 90 weight-%, or in the range of from 75 to 90 weight-%. According to the invention, the suspension further comprises fibers in an amount of at least 5%, or in the range of from 5-25 weight %, 10-25%, or most preferably in the range of 10-15 weight %, as calculated on the total solid content of said suspension. The suspension further comprises a formation aid.

The suspension may also comprise small amounts of other process or functional additives, such as fillers, pigments, wet strength chemicals, dry strength chemicals, retention chemicals, cross-linkers, softeners or plasticizers, adhesion primers, wetting agents, biocides, optical dyes, fluorescent whitening agents, de-foaming chemicals, hydrophobizing chemicals such as AKD, ASA, waxes, resins etc. Further additives can also be added to the formed web using a size press.

According to the invention, the suspension comprising the MFC, the reinforcement fibers and the formation aids is mixed before being formed as a web. The mixing may be done in a fibrillator or in a refiner. It has surprisingly been found that the forming the film in such a manner so that the film exhibits a formation number of below 0.45 g0.5/m, preferably below 0.4, or even below 0.3 g0.5/m, gives rise to superior oxygen barrier- and strength properties. The film formed according to the invention may further function as a barrier against other gases, grease, mineral oils and/or aromas.

The suspension may be applied onto the wire at a consistency of 0.1 to 1.0 wt-% consistency. Subsequent to the wet web being placed onto the wire, it is dewatered to form a film.

The dewatering on wire may, according to one embodiment be performed by using known techniques with single wire or twin wire system, frictionless dewatering, membrane-assisted dewatering, vacuum- or ultrasound assisted dewatering, etc. After the wire section, the wet web is further dewatered and dried by mechanical pressing including shoe press, hot air, radiation drying, convection drying, etc. The film might also be dried or smoothened by soft or hard nip (or various combinations) calenders etc.

Alternatively the MFC film could be prepared by casting the above described mixed MFC suspension, at consistency of 5 to 25 wt-%, onto a polymeric substrate to form a coating film, followed by drying and finally separating the film by peeling if off from the substrate.

The MFC film formed by the method described has preferably a basis weight of 10-40 g/m2, more preferably of 20-30 g/m2, and a thickness of below 50 μm or below 40 μm, preferably in the range of 20-40 μm.

The film as described above is as such useful for packaging foods or liquids.

The film may alternatively be used as a MFC film layer in a multilayer laminate. In this embodiment, the film be applied onto a fibrous paper, paperboard or cardboard made of chemical or wood pulp. Preferably the fibrous base is paperboard of a weight of 130 to 250 g/m2, preferably 200 to 250 g/m2, or paper of a weight of 40 to 130 g/m2. The laminate may further comprise polymer layers, e.g. of polyethylene, or further barrier layers. Such laminates are useful e.g. for is useful e.g. for heat-sealable packages of food or liquids.

Example 1

The aim of this trial was to clarify the effect of long fibers and improved formation (by addition of formation aids and mixing) on MFC web dewatering and runnability as well as on resulting product properties, especially barrier properties. In addition to MFC, retention system comprising of wet end starch (4 kg/t), galactomannan (1 kg/t), silica (5 kg/t), and wet-strength chemical (5 kg/t) was used. In addition, hydrophobic sizing agent AKD (1.5 kg/t) was applied into the wet end. Test point P11_1 was the reference containing 100% MFC as fiber source.

Addition of 15 wt-% of hardwood fibers to MFC film (P11_2) gave improved barrier properties (measured as OTR, cc/m$^2$*day) compared to addition of 15 wt-% of softwood fibers (P11_5). With the addition of 50 kg/t of fine MFC together with 15 wt-% of hardwood fibers (P20_5) the dispersion of these long fibers in the MFC film was improved, as indicated by the lower specific formation value and higher density of the film. At the same time the oxygen barrier properties of the MFC film (P20_5) were improved compared to test point with 15 wt-% of hardwood fibers without addition of fine MFC (P11_2). Addition of high Mw A-PAM to the pulper, followed by mixing with fiberizer of the high Mw A-PAM and MFC (P20_6) improved specific formation of the MFC film and OTR compared to test point without addition of dispersion aid (P11_1). Table 2 summarizes the test point results.

TABLE 1

Test points

| | P11_1 | P11_2 | P11_3 | P11_5 | P20_5 | P20_6 |
|---|---|---|---|---|---|---|
| Fiber source, % | MFC 100 | MFC 85 Birch 15* | MFC 70 Birch 30* | MFC 85 Pine 15* | MFC 85 Birch 15* | MFC 100 |
| Wet end starch, kg/t | 4 | 4 | 4 | 4 | 4 | 4 |
| Silica, kg/t | 5 | 5 | 5 | 5 | 5 | 5 |
| PAE, kg/t | 5 | 5 | 5 | 5 | 5 | 5 |
| Galactomannan, kg/t | 1 | 1 | 1 | 1 | 1 | 1 |
| AKD, kg/t | 1.5 | 1.5 | 1.5 | 1.5 | 1.5 | 1.5 |
| Other additives, kg/t | — | — | — | — | Fine MFC 50 kg/t** | A-PAM 0.5 kg/t*** |
| O-water temp., ° C. | 50 | 50 | 50 | 50 | 50 | 50 |
| Machine speed, m/min | 15 | 15 | 15 | 15 | 15 | 15 |
| Target grammage, g/m$^2$ | 30 | 30 | 30 | 30 | 30 | 30 |
| °SR | 96.5 | 94.5 | 92.0 | 94.0 | 97.0 | 97.0 |

*long fibers added to pulper, mixing together with MFC with fiberizer
**Fine MFC added to pulper with long fibers, followed by mixing with fiberizer
***High Mw A-PAM added to pulper, mixing together with MFC with fiberizer In test points P11_2 and P11_3, 15 wt-% and 30 wt-%, of hardwood fibers were mixed with MFC in the pulper, respectively, followed by mixing with fiberizer of the fibers and MFC. In test point P11_5 15 wt-% of softwood fibers were mixed with MFC in the pulper followed by mixing with fiberizer of the fibers and MFC. In test point P20_5 15 wt-% of hardwood fibers were mixed with addition of 50 kg/t of fine MFC to the pulper and the MFC, fine MFC and hardwood fibers were further mixed with fiberizer. In test point P20_6 high molecular weight (Mw) A-PAM was added to the pulper, followed by mixing with fiberizer of the high Mw A-PAM and MFC. Table 1 summarizes the test points.

Example 2

The MFC films containing 15-50 wt-% of hardwood fibers (P11_1-P11_4) and 15-wt % of softwood fibers (P11_5) were extrusion PE-coated with 25 g/m$^2$ of LDPE or 25 g/m$^2$ of HDPE/LDPE co-extrusion.

The oxygen transmission rate (OTR) of the PE-coated MFC films was measured in 23° C. and 50% relative humidity (RH) conditions. Based on the results with 15 wt-% addition of hardwood fibers (P11_2) to MFC film the OTR of PE-coated film, either LDPE or HDPE/LDPE coated, is approximately on the same level as with PE-

TABLE 2

Results for the test points

| | P11_1 | P11_2 | P11_3 | P11_5 | P20_5 | P20_6 |
|---|---|---|---|---|---|---|
| Fiber source | MFC | MFC 85 Birch 15 | MFC 70 Birch 30 | MFC 85 Pine 15 | MFC 85 Birch 15 | MFC 100 |
| Other additives, kg/t | — | — | — | — | Fine MFC 50 kg/t | A-PAM 0.5 kg/t |
| Grammage, g/m$^2$ | 35.7 | 32.4 | 32.3 | 31.9 | 31.5 | 30.1 |
| Thickness, μm | 49 | 48 | 48 | 50 | 42 | 40 |
| Density, kg/m$^3$ | 733 | 669 | 667 | 640 | 759 | 752 |
| Specific formation, g$^{0.5}$/m | 0.45 | 0.45 | 0.38 | 0.43 | 0.27 | 0.28 |
| OTR, cc/(m$^2$-day)* | 30.4 | 6604 | fail** | fail** | 7 | 8 |

*determined at 50% RH, 23° C.
**fail is over 10 000 cc/(m$^2$-day)

coated film having 100% of MFC as fiber source (P11_1). Furthermore, with 30 wt-% addition of hardwood fibers (P11_3) the OTR values are better compared to 15 wt-% addition of softwood fibers (P11_5) to MFC film after LDPE or HDPE/LDPE coating. Results of PE-coated films are summarized in Table 1.

TABLE 1

Results for the PE-coated test points

|  | P11_1 | | P11_2 | | P11_3 | | P11_5 | |
|---|---|---|---|---|---|---|---|---|
| Fiber source | MFC | | MFC 85 Birch 15 | | MFC 70 Birch 30 | | MFC 85 Pine 15 | |
| PE-coating, 25 g/m² | LDPE | HDPE/ LDPE | LDPE | HDPE/ LDPE | LDPE | HDPE/ LDPE | LDPE | HDPE/ LDPE |
| OTR, cc/(m²-day)* | 1.5 | 1.5 | 3.0 | 2.7 | 80.1 | 90.4 | fail | 362 |

*determined at 50% RH, 23° C.
**fail is over 10 000 cc/(m²-day)

The invention claimed is:

1. A method of manufacturing a fibrous, oxygen barrier film comprising the steps of:
   a. providing a suspension comprising:
      i. a first microfibrillated cellulose (MFC) in an amount of at least 50 weight %, wherein said first MFC exhibits a Schopper-Riegler value (SR) value of at least 85,
      ii. reinforcement fibers, having a weighted fiber length of >0.8 mm, in an amount between at least 5 to 25 weight %, wherein said reinforcement fibers exhibits an SR value of below 60,
      iii. a formation aid,
         wherein all percentages calculated on the total solid content of said suspension,
   b. mixing said suspension to form a mixture,
   c. forming a fibrous web from said mixture,
   d. dewatering and/or drying said fibrous web to form a film having a basis weight of less than 40 g/m², a specific formation number of below 0.45 $g^{0.5}$/m, and an Oxygen Transmission Rate (OTR) value of below 100 ml/m²/per 24 h at 50% RH determined at 50% relative humidity in accordance with ASTM D 3985-05.

2. The method according to claim 1, wherein the MFC is made from softwood fibers.

3. The method according to claim 1, wherein the reinforcement fibers exhibit an SR value of below 50.

4. The method according to claim 1, wherein the reinforcement fibers are hardwood kraft fibers.

5. The method according to claim 1, wherein the formation aid is added to the reinforcement fibers before these are mixed with the first MFC.

6. The method according to claim 1, wherein the formation aid is added to the first MFC at the formation thereof.

7. The method according to claim 1, wherein the reinforcement fibers have been mechanically treated before being added to the suspension.

8. The method according to claim 1, wherein the reinforcement fibers have been chemically treated before being added to the suspension.

9. The method according to claim 1, wherein the reinforcement fibers are never-dried fibers.

10. The method according to claim 1, wherein the formation aid is chosen from the group consisting of anionic polyelectrolytes, a second finer MFC having an SR value higher than that of the first MFC, modified starch, gum-like natural polymers or their synthetic equivalents, polyethylene oxides, metaphosphates and unmodified or modified polyvinyl alcohol (PVA).

11. The method according to claim 10, wherein the formation aid is anionic polyacrylamide (APAM) and wherein the APAM is present in the suspension in an amount giving rise to a content of said APAM in the web in the range of 0.1 to 5 kg/metric ton of the web.

12. The method according to claim 10, wherein the formation aid is a second, finer MFC, and wherein the finer MFC is present in the suspension in an amount giving rise to a content of said second, finer in the web in the range of 20-100 kg/metric ton of the web.

13. The method according to claim 12, wherein the second finer MFC has a SR value and/or a viscosity higher than said first MFC.

14. The method according to claim 12, wherein the first MFC has a viscosity of below 4000 cP and said second MFC has a viscosity of above 4000 cP.

15. The method according to claim 12, wherein the fibers of said second finer MFC has a weighted average length smaller than said first MFC.

16. The method according to claim 1, wherein the method further comprises the steps of forming the web by applying the suspension mixture onto a porous wire, dewatering the web, drying the web and calendaring the web to form the film.

17. The method according to claim 1, wherein the method further comprises the step of applying a polymer layer onto the formed film.

18. The method according to claim 1, wherein said first MFC exhibits an SR value of at least 90.

19. The method according to claim 1, wherein the MFC is made from pine fibers.

20. The method according to claim 1, wherein the reinforcement fibers exhibit an SR value of below 40.

21. The method according to claim 10, wherein the formation aid is APAM and wherein the APAM is present in the suspension in an amount giving rise to a content of said APAM in the web in the range of 0.1-1 kg/metric ton of the web.

22. A fibrous-based oxygen barrier film, which comprises at least a first layer comprising:
   a. a first microfibrillated cellulose (MFC) in an amount of at least 50 weight %, wherein said first MFC exhibits a Schopper-Riegler value (SR) value of at least 85,
   b. reinforcement fibers having a length of >0.8 mm, in an amount between at least 5 to 25 weight %, wherein said reinforcement fibers exhibits an SR value of below 60,
   c. a formation aid,
   d. said film exhibiting a basis weight of less than 40 g/m², a formation number of below 0.45 $g^{0.5}$/m and an oxygen transmission rate (OTR) of below 100 ml/m²/per 24 hours at 50% RH determined at 50% relative humidity in accordance with ASTM D 3985-05.

23. The fibrous-based oxygen barrier film according to claim 22, further comprising a second layer comprising a polyolefin.

\* \* \* \* \*